UNITED STATES PATENT OFFICE.

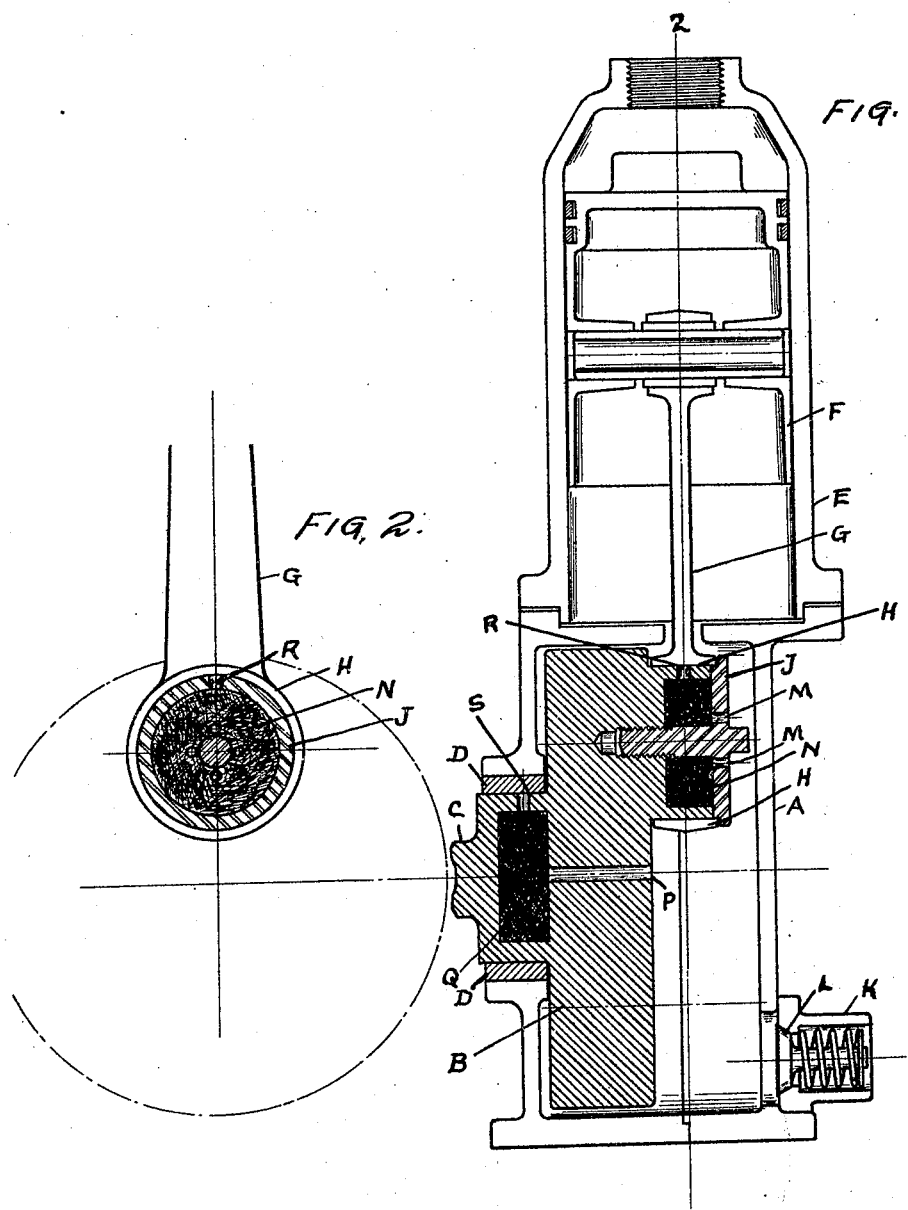

PROCTER BREVARD, OF HIGHLAND PARK, MICHIGAN.

LUBRICATING SYSTEM FOR EXPLOSIVE ENGINES.

1,405,396.  Specification of Letters Patent.  Patented Feb. 7, 1922.

Application filed November 1, 1920. Serial No. 421,008.

*To all whom it may concern:*

Be it known that I, PROCTER BREVARD, a citizen of the United States, residing at Highland Park, in the county of Wayne, State of Michigan, have invented a certain new and useful Improvement in Lubricating Systems for Explosive Engines, and declare the following to be a full, clear, and exact description of the same, such as will enable others skilled in the art to which it pertains to make and use the same, reference being had to the accompanying drawings, which form a part of this specification.

This invention relates to a construction for effecting the easy and efficient lubrication of internal combustion engines; it is especially adaptable to two-cycle engines, and has for its object an improved organization of parts by means of which a mixed oil, combining explosive and lubricating characteristics, may be employed and the different elements for these two purposes be segregated by the action of the mechanism; thereby not only reducing the number of parts necessary for handling the fluid, but as well projecting the portion of the mixture destined for lubrication directly against the bearings parts needing it, so as to reduce the friction and wear to a minimum.

In the drawings,

Figure 1 is a partly sectional and partly elevational view of a single cylinder and its related portion of the crank case; and Figure 2 is a sectional elevation view taken on line 2—2 of Fig. 1.

A represents a crank case in which the crank head B is adapted to rotate; C being a broken off representation of the shaft whose enlarged portion adjacent the crank case wall rests in bearings D. E represents the cylinder in which engages the piston F, whose piston rod G engages with its annular end H about the crank pin J of the crank head.

Mingled lubricating and explosive fluid is adapted to be fed into the crank chamber through the pipe K and past the spring-held valve L, and is compressed by the action of the piston F in the cylinder. As the piston descends, compressing this mixture in the crank case, a portion is driven through the small holes M into the fibrous-filled cavity N within the crank-head; and similarly a portion thereof makes its way through the small axial passage P in the crank-head into the fibrous-filled cavity Q. Each one of these cavities is provided with a radially disposed outlet passage, as R and S, respectively, leading to their adjacent bearing surfaces H and D.

The compressive action of the piston having forced the mingled explosive and lubricating fluid into the fibrous-filled spaces N and Q, when the compression is released the volatile or explosive portion of the mixture that has made its way into the cavities expands and passes out through the passages M and P into the crank case, while the non-volatile or lubricating element will remain for centrifugal projection through the passages R and S, against the bearings H and D. This action is so direct and positive that even if but one vent-hole be employed for each bearing, it is generally sufficient to effect the adequate lubrication thereof, the full-filled portion of each chamber diametrically opposite to the vent-holes merely serving as a storage space which feeds its over-saturation to the other side. It would, however, be entirely within the scope of my invention to provide more than one of these vent-holes; and similarly, while for convenience and compactness of construction, I have illustrated the crank-head cavity Q as arranged co-axially with the crank-head as a whole, it is of course clearly within the scope of my invention to locate all or a major portion of it to one side of the axial center of the crank-head, thus participating to a greater degree in the centrifugal throw imparted to the lubricating element by the rotation of the crank-head.

I make no effort to illustrate any particular form of crank case or cylinder-head, or to designate any particular ignition means, as my invention is equally applicable to any of a varitey of forms of these.

What I claim is:

1. In combination with a crank case, a normally closed inlet valve therefor, a crank-head rotatably engaging therein, said crank-head being provided with fibrous-filled cavities adjacent its bearing portions and with passages connecting said cavities with the interior of the crank case and with the adjacent bearing surfaces, and means for rotating said crank-head and for acting upon the mixture entering the crank case in a way to effect a separation thereof into its constituent explosive and lubricating elements, for the centrifugal projection of the latter through certain of said passages against their bearing surfaces.

2. In combination with a crank case, a partially hollowed crank-head rotatably engaging therein, a piston and piston-rod operatively connected with said crank-head, a fibrous filling for said partially hollowed portions of said crank-head, and passages connecting said fibrous-filled portions of the crank-head with the interior of the crank case and with the bearings about said crank-head, whereby the mingled explosive and lubricating fluid fed into the crank case may be absorbed by the fibrous-filling within the crank-head, there to be separated by compression and expansion, and whereby the lubricating element may, when segregated, be thereafter guided to the bearing surfaces.

3. The combination, with a crank case and a cylinder appurtenant thereto, of a piston engaging in said cylinder, a piston rod extending from connection with said piston into said crank case, a crank-head rotatably engaging within said crank case and operatively connected with said piston rod, said crank-head having a plurality of fibrous-filled spaces adjacent its bearing points and each space being connected with the interior of the crank-case and with the adjacent bearings, whereby some of the mingled fluid entering the crank case makes its way to the fibrous-filled spaces in the crank-head, whence the lubricating element thereof is thereafter centrifugally projected to the bearing surfaces.

In testimony whereof, I sign this specification in the presence of two witnesses.

PROCTER BREVARD.

Witnesses:
WILLIAM M. SWAN,
JEFFERSON C. THURBER.